United States Patent
Wu et al.

(10) Patent No.: US 11,671,668 B2
(45) Date of Patent: Jun. 6, 2023

(54) TRAINING OF MULTIPLE PARTS OF A MODEL TO IDENTIFY BEHAVIOR TO PERSON PREDICTION

(71) Applicant: HULU, LLC, Santa Monica, CA (US)

(72) Inventors: Dingming Wu, Beijing (CN); Changsheng Xiang, Beijing (CN); Wu Zhang, Beijing (CN); Chunyang Wei, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 17/318,215

(22) Filed: May 12, 2021

(65) Prior Publication Data
US 2022/0368989 A1    Nov. 17, 2022

(51) Int. Cl.
| | |
|---|---|
| *H04N 21/466* | (2011.01) |
| *H04N 21/45* | (2011.01) |
| *H04N 21/442* | (2011.01) |
| *G06N 7/01* | (2023.01) |

(52) U.S. Cl.
CPC ........... *H04N 21/4667* (2013.01); *G06N 7/01* (2023.01); *H04N 21/44218* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 2014/0207718 A1* | 7/2014 | Bento Ayres Pereira | .................. G06N 7/005 706/12 |
| 2015/0070516 A1* | 3/2015 | Shoemake | ......... H04N 21/4542 348/207.11 |
| 2015/0324356 A1* | 11/2015 | Andres Gutierrez | ....................... H04N 21/4668 707/734 |
| 2016/0300252 A1* | 10/2016 | Frank | ................ G06F 16/24578 |
| 2019/0208272 A1* | 7/2019 | Hattery | .............. H04N 21/4622 |
| 2020/0126100 A1* | 4/2020 | Goyal | ................. H04N 21/812 |
| 2020/0221180 A1* | 7/2020 | Pietsch | ............ H04N 21/44227 |
| 2020/0364216 A1* | 11/2020 | Fan | ..................... G06F 16/2379 |
| 2021/0374338 A1* | 12/2021 | Shrivastava | ........... G06F 40/56 |

\* cited by examiner

*Primary Examiner* — Jefferey F Harold
*Assistant Examiner* — Charles N Hicks
(74) *Attorney, Agent, or Firm* — Kwan & Olynick LLP

(57) ABSTRACT

In some embodiments, a method receives a first set of probabilities mapping a behavior to a user for a set of behaviors in a video delivery system. A first part of a model is used to predict the first set of probabilities. The method receives a second set of probabilities mapping a user to a behavior for a set of users that are using an account on the video delivery system. A second part of the model is used to predict the second set of probabilities. A combined probability is calculated for the set of behaviors and the set of users based on the first set of probabilities and the second set of probabilities. The method updates a second parameter of the second part of the model while keeping a first parameter of the first part of the model fixed and outputs the second parameter of the second part of the model upon determining the training of the model is finished.

20 Claims, 6 Drawing Sheets

TRAINING OF MULTIPLE PARTS OF A MODEL TO IDENTIFY BEHAVIOR TO PERSON PREDICTION

BACKGROUND

A video delivery service may allow an account to stream videos to watch. The account may usually be shared by multiple users (e.g., family members). For example, a husband and wife may use the same account to view videos at different times. The video delivery service would not know whether the husband or wife is viewing a video currently in real-time.

It may be difficult to identify a user or type of user when multiple users share an account. Precise identification of users within shared accounts may be necessary for providing more efficient targeting of video content or other personalized digital services, such as supplemental content. Furthermore, identification of users should provide a streamlined experience that is also privacy-preserving, in that it may only utilize information that a user has opted to provide.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A video delivery system (e.g., a streaming service or video publisher) may provide videos for an account to view. The video delivery system would like to identify the user that is watching the video. The identification may provide information that is used to target the user. The video delivery system may use a model that can predict the user that is currently watching the video. Some embodiments train the model in an improved manner to predict the user.

The video delivery system may include a first data set for each account that uses the video delivery system via a video delivery service. The first data set may include a pool of behaviors that are recorded from the account using the video delivery system. The behaviors may include which videos are watched, preferences for certain genres, actions taken on the video delivery system, etc. The video delivery system may not be able to map the behaviors to the actual user who is watching the video. However, the video delivery system may map the behavior to probabilities that a user with certain characteristics is viewing the video, such as a first probability that female is viewing the video and a second probability that a male is viewing the video.

The video delivery system may use a second data set, such as a third-party data set, that may identify the users of the account along with the characteristics of each user. The video delivery system may train a main model to link the behaviors from the first data set to the users in the second data set. The main model may include a first part of the model for the first data set and a second part of the model for the second data set. The training process may train the two parts of the model together. The first part may be referred to as a first model and the second part may be referred to as a second model. As will be described below, the training process may fix the parameters of the first model and use a result (e.g., a joint probability) from the two models to train the parameters of the second model. This type of training may improve the training process of the main model. The trained model may be used to identify the user who is watching a video at the current time, and that information can be used by the video delivery system in real-time. For example, the video delivery system may more efficiently target the user with supplemental content (e.g., advertisements).

System Overview

Figure 1:
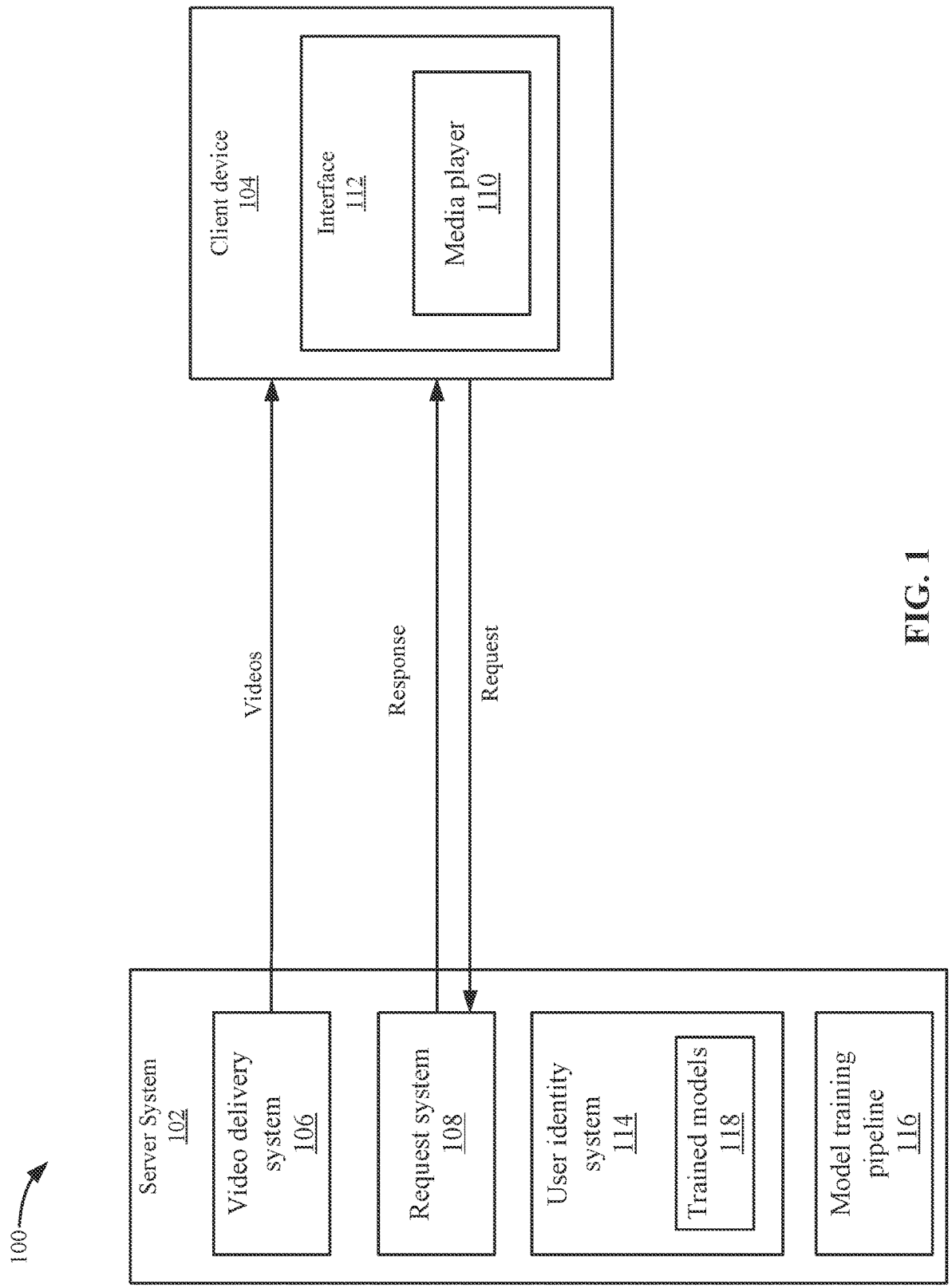
FIG. 1 depicts a simplified system of a method for identifying a user according to some embodiments.

FIG. 1 depicts a simplified system 100 of a method for identifying a user according to some embodiments. System 100 includes a server system 102 and client device 104. Although a single entity for server system 102 and client device 104 are shown, it will be understood that server system 102 may be implemented using multiple devices. Also, server system 102 may be communicating with multiple client devices 104. Video delivery system 106 may offer a video delivery service to user accounts that may be using client devices 104. For example, client device 104 may send a request for a video to download, and video delivery system 106 delivers the video to client device 104. A content delivery network (now shown) may be used to deliver the videos to client device 104. In some embodiments, video delivery system 106 may include a library of videos that can be requested on-demand and/or may provide a live television service in which users can watch live linear television. Also, the type of content may be different, such as content may be movies, shows, etc.

Client device 104 may be include different computing devices, such as a mobile device, tablet device, smartphone, set top box, television, etc. Client device 104 may be configured to play back videos, such as on a media player 110 that is being displayed on a user interface 112. In some embodiments, users of a user account may use the same client device 104, such as multiple users may use a living room device. Different users may also use a separate client device 104, such as a single user may only use a mobile device.

A user account may sign up for the video delivery service being offered by video delivery system 106. The user account may be used by multiple users, such as multiple people in a family. Each user of the user account may be associated with different sets of characteristics. For example, a first user may be female; a second user may be a male; a third user may be within an age range; and so on. A user may have a single characteristic or multiple characteristics. The account may include profiles that can be configured for specific users or groups of users. However, even if profiles are provided, multiple users may use just one of the profiles. When the term account is used, the account is an entity that could be used by multiple users.

In some embodiments, during playback of a video (referred to as "main content"), supplemental content may be played. For example, client device 104 may send a request for supplemental content for a break in the main video. The supplemental content that may be content that may be different from the main content being played by media player 110. For example, client device 104 may be playing a video, such as a movie or show. During the movie or show, a break may occur in which supplemental content may be played. In some embodiments, the supplemental content may not be requested by the user. For example, advertisements may be inserted into the main content that was requested by the user. When the break occurs, client device 104 may send a request for the supplemental content, but not specify which supplemental content. Rather, video delivery system 106 selects eligible instances of supplemental content and then an instance the supplemental content to send to client device 104. The selection of eligible instances of supplemental content may be based on targeting characteristics, such as one instance of supplemental target may be targeted to females and another instance of supplemental content may be targeted to males. Although the above type of insertion of the supplemental content is described, the request may be associated with other scenarios. For example, any scenario in which a specific user should be identified may be contemplated. For example, any type of advertisement, such as banner advertisements, may use embodiments as described herein. Also, the type of videos that are presented for possible playback to a user may be adjusted based on identifying a user. That is, videos that may be popular for an age range may be presented for selection to a user that is identified as being within the age range.

A request system 108 may respond to the request. For example, request system 108 may include or be associated with an advertisement server that may select instances of supplemental content that are eligible for a response to the request. Then, request system 108 may select one or more of the instances of supplemental content. User identity system 114 may determine the user that may be using the account at the present time to view the main content. For example, user identity system 114 may input the contextual information for the playback session into the model and output the identified user. A model training pipeline 116 may train a model as a trained model 118, where trained model 118 is used to output the identified user. The identification of the user that is viewing the main content may be used at different stages to respond to the request. For example, the advertisement server may use characteristics for the identified user to select the eligible instances of supplemental content. The eligible instances of supplemental content may have targeting requirements that meet the characteristics of the identified user. Also, request system 108 may use the characteristics for the identified user to select the supplemental content. For example, when selecting eligible supplemental content, request system 108 may select supplemental content based on the characteristics of the identified user. However, request system 108 may select the instance of supplemental content using factors other than the characteristics of the user, such as by using a predetermined or predefined goal (e.g., click through rate, guaranteed pacing, etc.). Although the above process of using an advertisement server is described, other methods may be used, such as request system 108 may select the instances of supplemental content using the characteristics for the identified user without communicating with the advertisement server.

Figure 2:
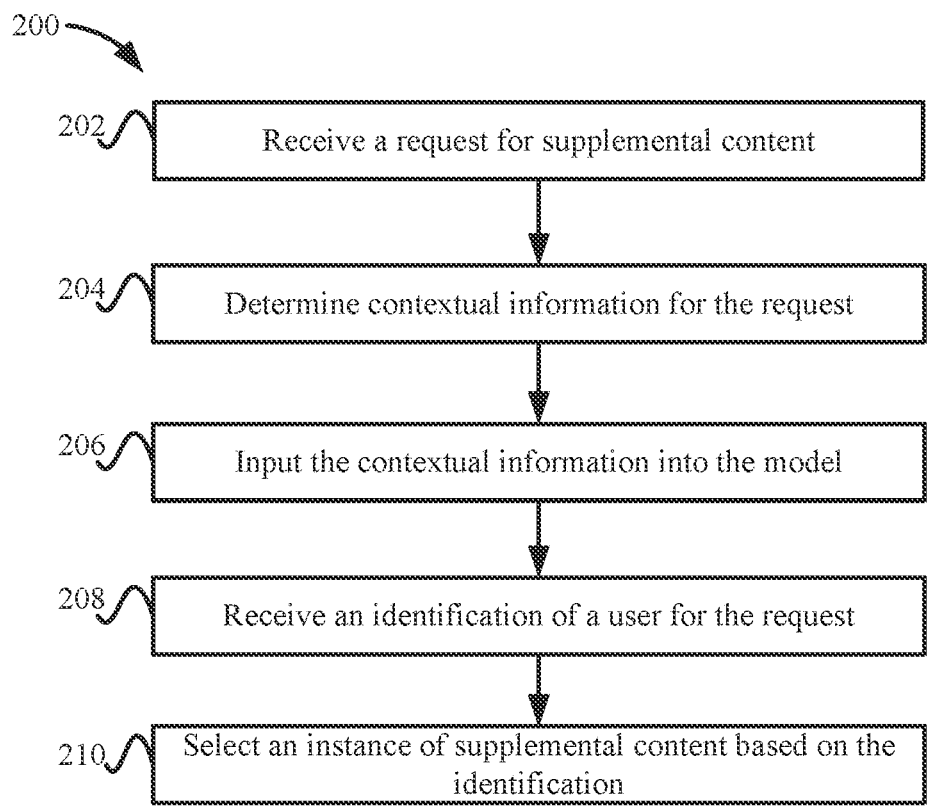
FIG. 2 depicts a simplified flowchart of a method for selecting supplemental content according to some embodiments.

FIG. 2 depicts a simplified flowchart 200 of a method for selecting supplemental content according to some embodiments. At 202, request system 108 receives a request for supplemental content. The request may be received during the playback of main content.

At 204, request system 108 determines contextual information for the request. The request itself may send contextual information for the playback session. Also, request system 108 may determine the contextual information from stored information at video delivery system 106. The contextual information may include characteristics for the present playback session, such as different features that may include the watch history for the account, a time of day, preferences for the account, etc.

Then, at 206, request system 108 inputs the contextual information into a model for a user identity system 114. User identity system 114 may analyze the contextual information and identify the user that is considered to be the most probable based on the context. That is, user identity system 114 may select a user that most likely may be using the account during the present playback session. When "user" is used, the user may be identified in different ways. In some embodiments, the user may be identified via characteristics. For example, the account may include a female user and a male user. The user may be identified as a female user of the account or a male user. Different ways of identifying the user may be used including using names of the users, but each identification may be associated with at least one characteristic. Although identifying a single user is described, identifying a combination of users may also be performed, such as a combination of a user #1 and a user #2, user #1 and a user #3, etc.

At 208, request system 108 receives the identification of the user for the request from user identity system 114. The identification of the user may identify a user with certain characteristics. Examples of users that are identified may be a first user with a first set of characteristics and a second user with a second set of characteristics.

At 210, request system 108 selects an instance of supplemental content based on the identification. For example, the instance may be targeted to a characteristic of the identified user.

User identity system 114 may use a model to perform the prediction. As will be described in more detail below, model training pipeline 116 may train the model using the first data set and the second data set in a unified manner to adjust parameters of a second model for the second data set.

Model Training

Figure 3:
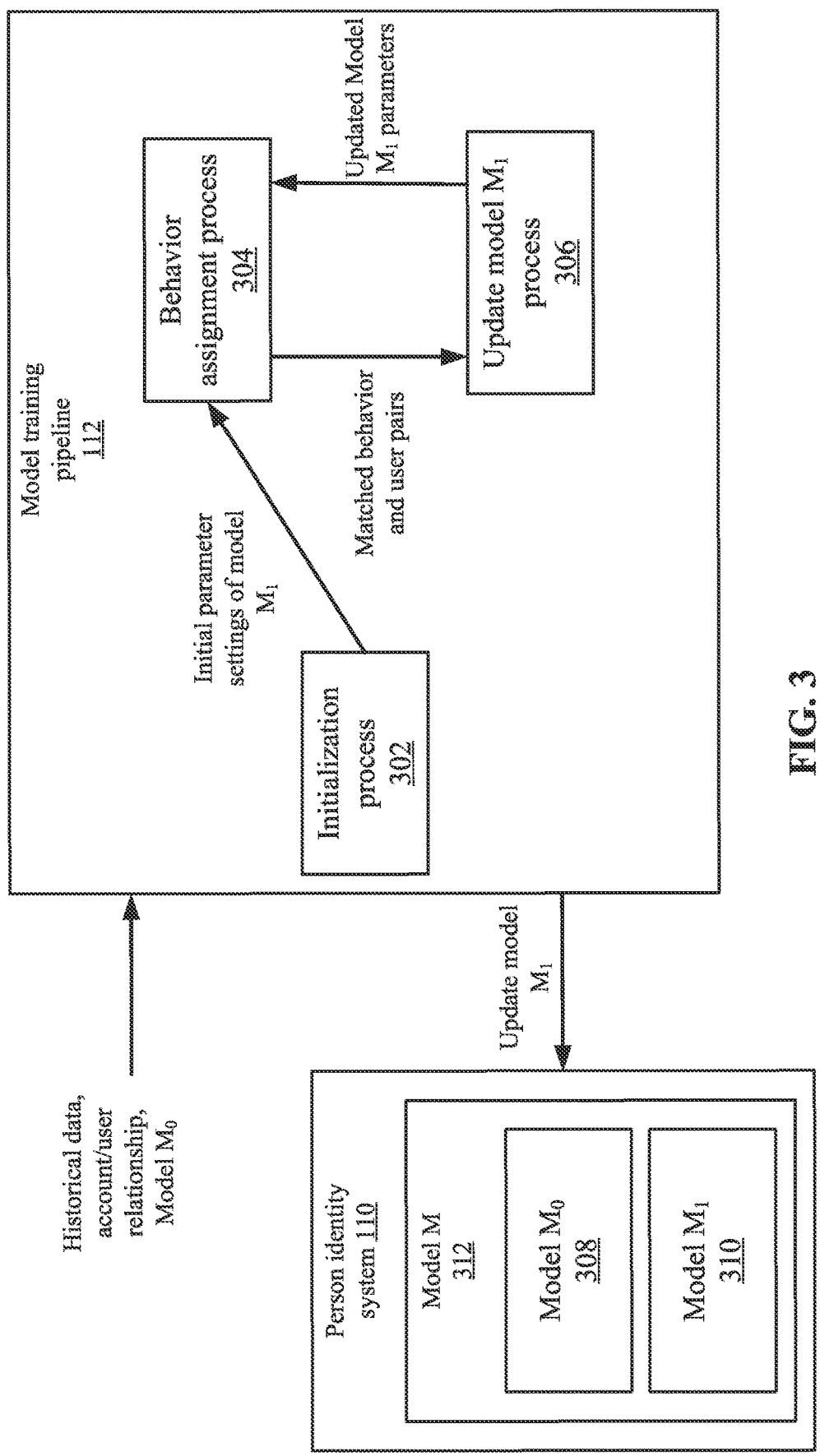
FIG. 3 depicts a more detailed example of a model training pipeline according to some embodiments.

Model training pipeline 116 may train a model used by user identity system 114 to identify the user that is using the account. FIG. 3 depicts a more detailed example of model training pipeline 116 according to some embodiments.

A prediction network may use model M 312 to generate a prediction of which user is watching a video currently. The prediction network includes nodes that process an input and provide an output based on parameter values from model M 312. Model M 312 may include parts, which may be referred to as separate models. As shown, model M 312 includes two models, model $M_0$ 308 and model $M_1$ 310. The difference between model $M_0$ 308 and model $M_1$ 310 may be the type of input that is received and the type of output that is provided. Parameters of each model may also be different and be trained separately.

A first prediction network may use model $M_0$ 308 to process the first data set, such as data from the use of video delivery system 106 by users of an account. For example, model $M_0$ 308 may be used to process information for the accounts that are using video delivery service 106 and also information for behavior (B) associated with each account. The behavior may be a pool of behavior logs that may include features (F). For example, the behavior logs may indicate that the account watched a series X at a time Y on a device Z, such as a specific episode of a series at a time on a device type (e.g., a mobile device). Model $M_0$ 308 may be a probabilistic prediction model that predicts a behavior to user of $prob_0(p_i|f)$. This may be also depicted as a behavior-to-attributes probability $prob_0(a|f)$, where "a" is attributes.

A second prediction network may use model $M_1$ 310 to process the second data set, such as a data set from a third party that is different from video delivery system 106. The second data set may be information that is not determined by the use of video delivery system 106 from the account. The second data set may include information that may indicate multiple users ($p_i$) are associated with an account. Each user may have attributes (a), such as age, gender, etc. The user may be uniquely identified by one or more attributes, such as a user #1 may be associated with a female attribute and a user #2 may be associated with a male attribute. The information in the second data set may be determined using different methods, such as by surveys, searches, public records, user input, etc. Model $M_1$ 310 may be a probabilistic model that predicts a user to behavior of $prob_1(b|p_i; \Theta)$. This may be a user-to-feature probability of $prob_1(f|p_i; \Theta)$. The parameter $\Theta$ may be any tunable variable to formulate the probability that is being predicted. For one simpler model, one of the parameters can be the probability that user #1 watches a specific content genre among all genres, or the probability that user #2 watches any content in the morning. For a more complex model, such as deep neural network model, the parameters can be weights of a network. A difference between the first data set and the second data set is that the second data set identifies users of the user account. The first data set includes behaviors, but does not identify the users associated with those behaviors.

Model M 312 may receive a context for the playback session and identify a user that may most probably be associated with the current playback session. That is, model M 312 may predict a probability from a set of behavior features to a known user from the second data set. Model M 312 may be expressed as a likelihood function from the behavior features to the user of $prob(p_i|f)$.

Model $M_0$ 308 may be trained using supervised information as a prerequisite to the training of model $M_1$. The supervised information may include the behavior features and also the identified user for those features. The parameters of model $M_0$ 308 may be optimized during the training using the supervised information. Then, the parameters of model $M_0$ 308 may be fixed during the training procedure of model $M_1$ 310 by model training pipeline 116.

Model $M_1$ 310 may be trained using unsupervised information and the parameters of model $M_1$ 310 may be optimized during the training. Unsupervised information may be information in which the output is not known for a given input. Model $M_1$ 310 may assign one or more behaviors to each user and the parameters are trained to predict a high probability for assigning those behaviors to each user.

In the training process, model training pipeline 116 may include an initialization process at 302. For example, model training pipeline 116 may receive information for the training, such as historical data for an account (e.g., the first data set), an account-to-user relationship (e.g., the second data set), and model $M_0$ 308. The historical data may include historical behavior logs associated with a specific account and may not include supervised information that assigns the behavior to a user. In some embodiments, model $M_0$ 308 may be trained on a different data set that is being used to train model $M_1$ 310. That is, the supervised information of behaviors that are assigned to users may be used to train model $M_0$ 308, but may not be used in the training process of model $M_1$ 310. The supervised information used to train model $M_0$ 308 may be used, but is typically a small data set. The training of model $M_1$ 310 does not require the use of the supervised data set to accurately train the parameters of model $M_1$ 310 due to the training method described herein. An account to user relationship may identify the users with their associated attributes that are associated with the account.

The initialization process may initialize the parameters of model $M_1$. The initialization of the parameters from model $M_1$ may be set using different methods. For example, a constant probability from every user to every behavior may be set, such as $prob_1(b|p_i;\Theta)$=constant. The parameters of model $M_0$ 308 are fixed as discussed above and the parameters of model $M_1$ 310 are first taken from the initialization process, but later taken from update model $M_1$ process at 306 after the training starts. Other methods may also be used to initialize the parameters of model $M_1$ 310, such as by setting the values randomly.

A behavior assignment process at 304 may assign probabilities for behaviors to users that are used to train model $M_1$ 310. Different methods may be used. For example, the behavior assignment process may assign a probability of each behavior to each user, or may assign a behavior to a specific user for the behaviors found in the first data set. The behavior assignment process may use the parameters of model $M_1$ 310 and model $M_0$ 308 to process the input. Then, the behavior assignment process outputs information needed to update the parameters of model $M_1$ 310. For example, the behavior assignment process outputs a matched behavior and user pair for all historical behaviors found in the first data set. In other embodiments, the behavior assignment process outputs probabilities for all behaviors for all users.

To assign a behavior to a user, the behavior assignment process may combine a first probability output by model $M_0$ 308 and a second probability output from model $M_1$ 310, such as by using a joint probability. The joint probability may combine the probability from model $M_0$ 308 and model $M_1$ 310 in different ways, such as a multiplication of the two probabilities or a weighted combination. Then, the behavior assignment process matches a behavior to a specific user. Behavior assignment 304 may use different methods to assign the behavior to a user. For example, behavior assignment 304 may assign the user with the highest joint probability to a specific behavior using:

$$p^* = \max_i \{prob_0(p_i|f) \times prob_1(b|p_i; \Theta)\}$$

Also, behavior assignment 304 may select the user in a weighted random manner, with a probability proportional to the joint probability using:

$$\text{prob}(\text{choose } p_i) \propto \text{prob}_0(p_i|f) \times \text{prob}_1(b|p_i; \Theta).$$

Other methods may also be used. For example, the behavior assignment process may assign a joint probability for each behavior to each user. Also, the supervised information may be used to assign the behavior to a user instead of using the joint probability. In this case, behavior assignment 304 directly assigns the known user to the behavior.

An update model $M_1$ process at 306 receives the output from the behavior assignment process. Then, the update model $M_1$ process updates the parameters of model $M_1$ to better fit a likelihood of the current behavior assignments that are received. The update model $M_1$ process may perform the update using different methods, such as to maximize the likelihood of the current behavior assignment by adjusting the parameters of model $M_1$ 310. In some embodiments, the update model $M_1$ process may update model $M_1$ 310 according to a weighted sum objective when the assignment assigns probabilities for all behaviors to all users using:

$$\max \prod_j \text{prob}_1(b_j|p_i; \Theta).$$

The max function gives the largest possible value of the product over a set of terms j. When using the assignment of a probability of behavior j to user i ($w(b_j, p_i)$), model $M_1$ 310 can be modified using:

$$\max \sum_{i,j} w(b_j, p_i) \ln(\text{prob}_1(b_j|p_i; \Theta))$$

The max function gives the largest possible value of the sum of probability of behavior j to user i and a user to behavior probability from model $M_1$ 310.

The update model $M_1$ process may output updated parameters for model $M_1$ 310, which are used to update the parameters of model $M_1$. The parameters of model $M_1$ 310 may be updated in different ways, such as by replacing the existing parameters with the updated parameter values, adjusting the existing parameters based on the value of the updated parameters (e.g., using a function), etc. The training process then continues using the updated parameters.

Figure 4:
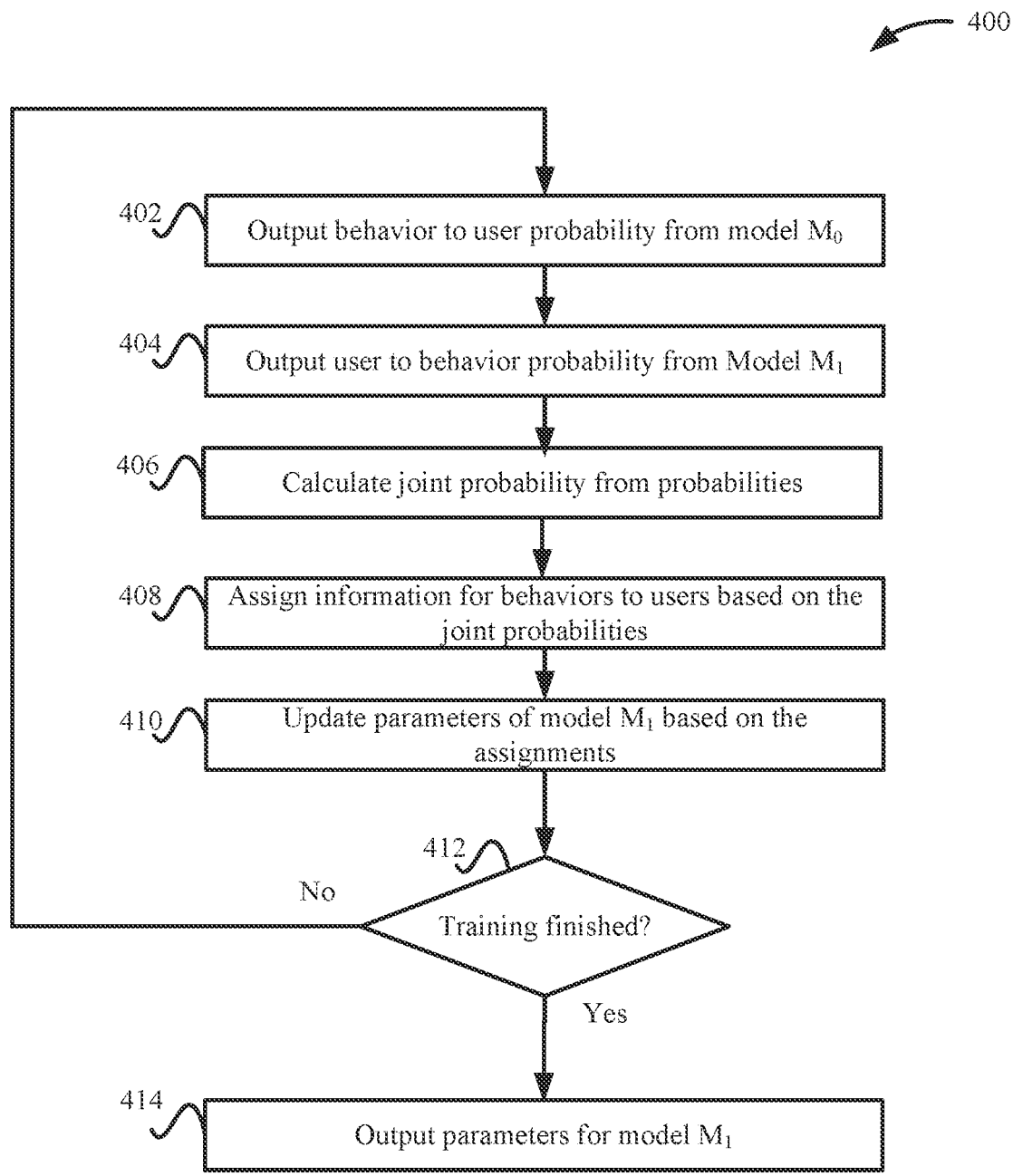
FIG. 4 depicts a simplified flowchart of a method for training a model $M_1$ according to some embodiments.

FIG. 4 depicts a simplified flowchart 400 of a method for training model $M_1$ 310 according to some embodiments. At 402, model $M_0$ 308 outputs a behavior to user probability for each behavior that is received. At 404, model $M_1$ 310 outputs a user-to-behavior probability for each user. Then, at 406, the behavior assignment process calculates a joint probability from the probabilities. The joint probability may assign joint probabilities for each behavior to each of the users.

At 408, the behavior assignment process assigns information for behaviors to users based on the joint probabilities. For example, each behavior may be assigned to a specific user based on the joint probabilities for each behavior-to-user pair.

At 410, the update model $M_1$ process updates the values of parameters of the model $M_1$ 310 based on the assignments. For example, the update model $M_1$ process may adjust the values such that the prior predicted probability may be more likely to predict the assigned behavior to user mapping. Then, at 410, model training pipeline 116 determines if the training is finished. For example, the behavior assignment process and the update model $M_1$ process may be performed until convergence. The convergence may be measured by a metric, such as the parameters may not change by a threshold over an iteration or a series of iterations. If the training is not finished, the process reiterates to 402 where model $M_1$ 310 is trained with the updated parameters while the parameters for model $M_0$ remain fixed. When training is finished, at 412, training model pipeline 116 outputs parameters for model $M_1$ 310. The parameters for model $M_1$ 310 may be optimized and can be used by the overall model M 312 to predict a behavior to a user.

Without using the supervised information from model $M_0$ 308, the training procedure may essentially be an expectation-maximization method to train an unsupervised model. A pure unsupervised cluster model can only group the behaviors into clusters but cannot link the behavior cluster to an actual user. However, model training pipeline 116 is able to merge the supervised information by using the trained parameters from model $M_0$ 308 to output a first probability that is combined with a second probability from model $M_1$ 310. Model training pipeline 116 uses the joint probability to determine a behavior to assign to a specific user. Then, the joint probability from both model $M_0$ 308 and model $M_1$ 310 is used to update the parameters of model $M_1$ 310. The above training process may determine the behavior-to-user assignments with more accuracy and may not rely on the accuracy of model $M_1$ 310 initially because the training process may be combined with supervised information to train model $M_1$ 310 more accurately. The training is more accurate because the prerequisite training of model $M_0$ 308 uses supervised information, which is more accurate than using solely unsupervised information.

Example

In some embodiments, a simple example may suppose there is only one attribute for the behavior, which is watch time (e.g., weekday or weekend). That is, the watch time of a video is classified as during the week or on the weekend. Also, there is only one attribute for the users, which is gender (e.g., female or male). That is, the users that use the account are identified as a male user and a female user.

There are five behavior logs from a first data set that are associated with one account, and the logs include the attributes: $1^{st}$ log—weekday, $2^{nd}$ log—weekday, $3^{rd}$ log—weekend, $4^{th}$ log—weekend, $5^{th}$ log—weekday. Each log may have an associated behavior, which may be a watch time (e.g., 7:00 pm on a Friday). Two users are associated with this account: $1^{st}$ user—female and $2^{nd}$ user—male.

Model $M_0$ is used to predict the probability of person conditional on behavior. For example, the output of model $M_0$ is:
p(female|weekday)=0.4
p(male|weekday)=0.6
p(female|weekend)=0.5
p(male|weekend)=0.5

The above probabilities may be in the range of 0 to 1, but other ranges may be used. A higher value may represent a higher probability. Model $M_1$ predicts the probability of behavior conditional on a user based on the parameters to be trained. For example, the output of model $M_1$ is:
p(weekday|female)=$p_{df}$
p(weekend|female)=$p_{ef}$ p(weekday|male)=$p_{dm}$
p(weekend|male)=$p_{em}$,
where d is weekday, f is female, e is weekend, and m is male.

The initialization process sets the initial values of the parameters of model $M_1$, which may output the probabilities of:
$p_{df}$=0.5
$p_{ef}$=0.5
$p_{em}$=0.5
$p_{em}$=0.5.

The above sets the probabilities to a constant value.

The behavior assignment process assigns the behavior-person pair based on the joint probability p(behavior|person)*p(person|behavior), which are:
joint probability(male, weekday)=0.6*0.5=0.3
joint probability (female, weekday)=0.4*0.5=0.2
joint probability (male, weekend)=0.5*0.5=0.25
joint probability (male, weekend)=0.5*0.5=0.25.

The assignment process may assign the behavior to the user with the maximum joint probability in this example, but other methods may be used as discussed above. According to the assignment process, the three weekday logs (e.g., the $1^{st}$, $2^{nd}$ and $5^{th}$ log) are assigned to the male user because the male user has a higher joint probability (0.3>0.2) than the female user for the weekday attribute. One of the weekend logs (e.g., the $3^{rd}$ log) is assigned to the male user and the other weekend log (e.g., $4^{th}$ log) is assigned to the female person. The weekend logs are split between the male user and the female user because the joint probability is the same for each user. If one of the users had a higher joint probability, then both weekend logs may have been assigned to that user. Overall, the male user has three weekday behaviors and one weekend behavior and the female person has one weekend behavior.

Thus, the updated parameters of model $M_1$ output the probabilities of:
p(weekday|female)=0
p(weekend|female)=1
p(weekday|male)=0.75
p(weekend|male)=0.25

The probabilities are the result maximizing a likelihood function knowing the behavior user pair. The four probabilities are the model parameters.

In the second round, the joint probabilities are:
joint probability(male, weekday)=0.6*0.75=0.45
joint probability(female, weekday)=0.4*0=0
joint probability(male, weekend)=0.5*0.25=0.125
joint probability(female, weekend)=0.5*1=0.5.

The probabilities from model $M_0$ do not change because the parameters are fixed. However, the probabilities change from model $M_1$ because the parameters have been updated. The second round assigns the behaviors as:
three weekday behaviors are assigned to the male person, and
two weekend behaviors are assigned to the female person The male user has a higher weekday joint probability and is assigned all the weekday behaviors from the three logs. The female user has a higher joint probability on the weekend and is assigned both weekend behaviors from the two weekend logs.

Thus, the updated parameters of model $M_1$ output the probabilities of:
p(weekday|female)=0
p(weekend|female)=1
p(weekday|male)=1
p(weekend|male)=0.

The parameters are updated in model $M_1$ and the $3^{rd}$ iteration will generate the same behavior-person assignment result and thus the iteration converges because the behavior to user pairs do not change. Accordingly, the model $M_1$ parameters output the probabilities of:
p(weekday|female)=0
p(weekend|female)=1
p(weekday|male)=1
p(weekend|male)=0

The updated parameters of model $M_1$ are combined with the parameters of model $M_0$ to form model M, which can determine the user for the context associated with a real-time ad request. For example, the parameters of model $M_0$ 308 and model $M_1$ 310 are fixed. Then, user identity system 114 receives the input for a request, such as a behavior that includes a characteristic. User identity system 114 uses an output of model $M_0$ 308 and model $M_1$ 310 to determine the user. In some examples, when only one behavior with a characteristic is used, user identity system 114 selects a user from the joint probabilities, such as the user with the highest joint probability.

Conclusion

Accordingly, embodiments train two different models to assign a behavior to a person. One model may use supervised information to train the model. Then, the second model may assign a behavior to a specific user. The parameters of the first model may be fixed while the parameters of the second model may be trained. The training provides an accurate update of the parameters for the second model. Then, a service may use the two combined models to associate a behavior to a specific user.

Example Embodiments

In some embodiments, a method for training a model is provided, the method comprising: receiving, by a computing device, a first set of probabilities mapping a behavior to a user for a set of behaviors in a video delivery system, wherein a first part of the model is used to predict the first set of probabilities; receiving, by the computing device, a second set of probabilities mapping a user to a behavior for a set of users that are using an account on the video delivery system, wherein a second part of the model is used to predict the second set of probabilities; calculating, by the computing device, a combined probability for the set of behaviors and the set of users based on the first set of probabilities and the second set of probabilities; updating, by the computing device, a second parameter of the second part of the model while keeping a first parameter of the first part of the model fixed; and outputting, by the computing device, the second parameter of the second part of the model upon determining the training of the model is finished.

In some embodiments, to determine the first parameter, the first part of the model is trained using supervised information that maps the behavior to the user for the set of behaviors.

In some embodiments, the training of the model trains the second part of the model, and the first parameter of the first part of the model is updated prior to training of the second part of the model.

In some embodiments, the method further comprising: receiving an input that is used to calculate the first set of probabilities and the second set of probabilities.

In some embodiments, the input comprises: a value for the first parameter of the first part of the model; first information for a behavior associated with the account; and second information mapping the set of users for the account to the set of behaviors.

In some embodiments, the method further comprising: initializing the second parameter of the second part of the model with an initialization value.

In some embodiments, the method further comprising: updating the initialization value based on the updating of the second parameter of the second part of the model.

In some embodiments, the method further comprising: iteratively performing the updating of the second parameter of the second part of the model until a threshold is met, wherein the value of the second parameter when the threshold is met is output.

In some embodiments, iteratively performing the updating comprises: performing the receiving of the first set of probabilities, the receiving the second set of probabilities, and the calculating the combined probability for each of the set of behaviors and the set of users based on the first set of probabilities and the second set of probabilities until the threshold is met.

In some embodiments, calculating the combined probability comprises: combining probabilities for the first set of probabilities and probabilities for the second set of probabilities to generate a joint probability for a plurality of pairs from combinations of the set of behaviors and the set of users.

In some embodiments, updating the second parameter comprises: assigning a probability to a user in the set of users for the set of behaviors; and updating the second parameter based on the probability for the set of behaviors that is assigned to the respective users.

In some embodiments, updating the second parameter comprises: receiving a set of logs that include a behavior; assigning a user in the set of users to each behavior in the set of logs; and updating the second parameter based on the assignment of the user to each behavior in the set of logs.

In some embodiments, the method further comprising: using the model to generate a prediction of a behavior to a user.

In some embodiments, the method further comprising: receiving a request for content; determining contextual information for the request; inputting the contextual information into the model; and generating a prediction of a user in the set of users based on the contextual information.

In some embodiments, the method further comprising: using the prediction to select content based on the user, wherein content is associated with an attribute associated with the user.

In some embodiments, the method further comprising: using the prediction to select supplemental content based on the user, wherein the supplemental content is inserted into a video being played by the account.

In some embodiments, a non-transitory computer-readable storage medium containing instructions for training a model, wherein the instructions, when executed, control a computer system to be operable for: receiving a first set of probabilities mapping a behavior to a user for a set of behaviors in a video delivery system, wherein a first part of the model is used to predict the first set of probabilities; receiving a second set of probabilities mapping a user to a behavior for a set of users that are using an account on the video delivery system, wherein a second part of the model is used to predict the second set of probabilities; calculating a combined probability for the set of behaviors and the set of users based on the first set of probabilities and the second set of probabilities; updating a second parameter of the second part of the model while keeping a first parameter of the first part of the model fixed; and outputting the second parameter of the second part of the model upon determining the training of the model is finished.

In some embodiments, to determine the first parameter, the first part of the model is trained using supervised information that maps the behavior to the user for the set of behaviors.

In some embodiments, further operable for: iteratively performing the updating of the second parameter of the second part of the model until a threshold is met, wherein the value of the second parameter when the threshold is met is output.

In some embodiments, an apparatus for training a model is provided, the apparatus comprising: one or more computer processors; and a non-transitory computer-readable storage medium comprising instructions, that when executed, control the one or more computer processors to be operable for: receiving a first set of probabilities mapping a behavior to a user for a set of behaviors in a video delivery system, wherein a first part of the model is used to predict the first set of probabilities; receiving a second set of probabilities mapping a user to a behavior for a set of users that are using an account on the video delivery system, wherein a second part of the model is used to predict the second set of probabilities; calculating a combined probability for the set of behaviors and the set of users based on the first set of probabilities and the second set of probabilities; updating a second parameter of the second part of the model while keeping a first parameter of the first part of the model fixed; and outputting the second parameter of the second part of the model upon determining the training of the model is finished.

System

Figure 5:
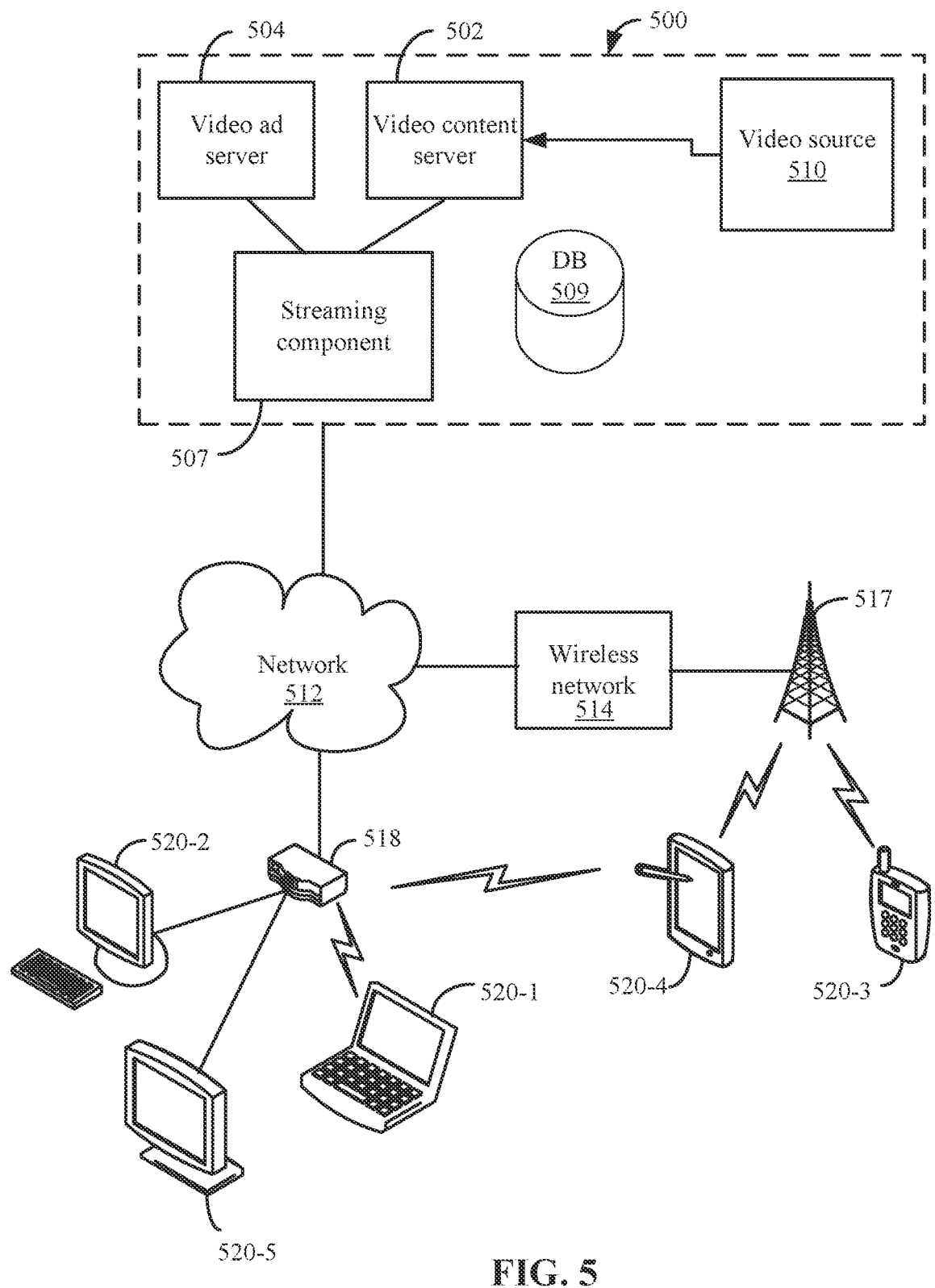
FIG. 5 depicts a video streaming system in communication with multiple client devices via one or more communication networks according to one embodiment.

Features and aspects as disclosed herein may be implemented in conjunction with a video streaming system 500 in communication with multiple client devices via one or more communication networks as shown in FIG. 5. Aspects of the video streaming system 500 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 500, video data may be obtained from one or more sources for example, from a video source 510, for use as input to a video content server 502. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 500 may include one or more computer servers or modules 502, 504, and/or 507 distributed over one or more computers. Each server 502, 504, 507 may include, or may be operatively coupled to, one or more data stores 509, for example databases, indexes, files, or other data structures. A video content server 502 may access a data store (not shown) of various video segments. The video content server 502 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 504 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 500, a public service message, or some other information. The video advertising server 504 may serve the video advertising segments as directed by a user interface controller (not shown).

The video streaming system 500 also may include request system 108, user identity system 114, and model training pipeline 116 (not shown).

The video streaming system 500 may further include an integration and streaming component 507 that integrates video content and video advertising into a streaming video segment. For example, streaming component 507 may be a content server or streaming media server. A controller (not shown) may determine the selection or configuration of advertising in the streaming video based on any suitable algorithm or process. The video streaming system 500 may include other modules or units not depicted in FIG. 5, for example, administrative servers, commerce servers, network infrastructure, advertising selection engines, and so forth.

The video streaming system 500 may connect to a data communication network 512. A data communication network 512 may comprise a local area network (LAN), a wide area network (WAN), for example, the Internet, a telephone network, a wireless cellular telecommunications network (WCS) 514, or some combination of these or similar networks.

One or more client devices 520 may be in communication with the video streaming system 500, via the data communication network 512, wireless cellular telecommunications network 514, and/or another network. Such client devices may include, for example, one or more laptop computers 520-1, desktop computers 520-2, "smart" mobile phones 520-3, tablet devices 520-4, network-enabled televisions 520-5, or combinations thereof, via a router 518 for a LAN, via a base station 517 for a wireless cellular telecommunications network 514, or via some other connection. In operation, such client devices 520 may send and receive data or instructions to the system 500, in response to user input received from user input devices or other input. In response, the system 500 may serve video segments and metadata from the data store 509 responsive to selection of media programs to the client devices 520. Client devices 520 may output the video content from the streaming video segment in a media player using a display screen, projector, or other video output device, and receive user input for interacting with the video content.

Distribution of audio-video data may be implemented from streaming component 507 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 507 may communicate with client device 520 using control messages and data messages to adjust to changing network conditions as the video is played. These control messages can include commands for enabling control functions such as fast forward, fast reverse, pausing, or seeking to a particular part of the file at the client.

Since streaming component 507 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 507 may use TCP-based protocols, such as HyperText Transfer Protocol (HTTP) and Real Time Messaging Protocol (RTMP). Streaming component 507 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 6:
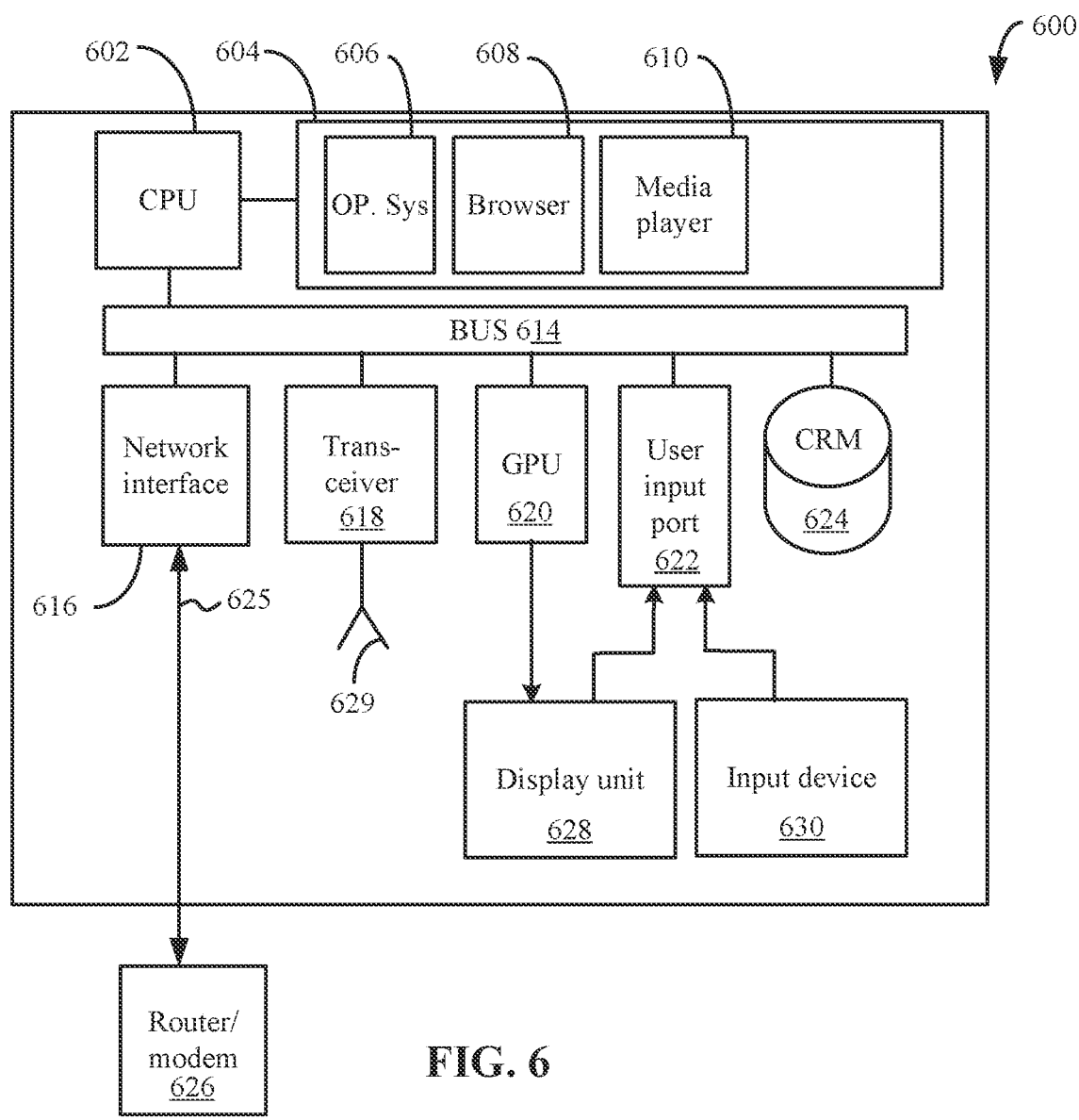
FIG. 6 depicts a diagrammatic view of an apparatus for viewing video content and advertisements.

Referring to FIG. 6, a diagrammatic view of an apparatus 600 for viewing video content and advertisements is illustrated. In selected embodiments, the apparatus 600 may include a processor (CPU) 602 operatively coupled to a processor memory 604, which holds binary-coded functional modules for execution by the processor 602. Such functional modules may include an operating system 606 for handling system functions such as input/output and memory access, a browser 608 to display web pages, and media player 610 for playing video. The memory 604 may hold additional modules not shown in FIG. 6, for example modules for performing other operations described elsewhere herein.

A bus 614 or other communication component may support communication of information within the apparatus 600. The processor 602 may be a specialized or dedicated microprocessor configured or operable to perform particular tasks in accordance with the features and aspects disclosed herein by executing machine-readable software code defining the particular tasks. Processor memory 604 (e.g., random access memory (RAM) or other dynamic storage device) may be connected to the bus 614 or directly to the processor 602, and store information and instructions to be executed by a processor 602. The memory 604 may also store temporary variables or other intermediate information during execution of such instructions.

A computer-readable medium in a storage device 624 may be connected to the bus 614 and store static information and instructions for the processor 602; for example, the storage device (CRM) 624 may store the modules 606, 608, 610 and 612 when the apparatus 600 is powered off, from which the modules may be loaded into the processor memory 604 when the apparatus 600 is powered up. The storage device 624 may include a non-transitory computer-readable storage medium holding information, instructions, or some combination thereof, for example instructions that when executed by the processor 602, cause the apparatus 600 to be configured or operable to perform one or more operations of a method as described herein.

A communication interface 616 may also be connected to the bus 614. The communication interface 616 may provide or support two-way data communication between the apparatus 600 and one or more external devices, e.g., the streaming system 500, optionally via a router/modem 626 and a wired or wireless connection. In the alternative, or in addition, the apparatus 600 may include a transceiver 618 connected to an antenna 629, through which the apparatus 600 may communicate wirelessly with a base station for a wireless communication system or with the router/modem 626. In the alternative, the apparatus 600 may communicate with a video streaming system 500 via a local area network, virtual private network, or other network. In another alternative, the apparatus 600 may be incorporated as a module or component of the system 500 and communicate with other components via the bus 614 or by some other modality.

The apparatus 600 may be connected (e.g., via the bus 614 and graphics processing unit 620) to a display unit 628. A display 628 may include any suitable configuration for displaying information to an operator of the apparatus 600. For example, a display 628 may include or utilize a liquid crystal display (LCD), touchscreen LCD (e.g., capacitive display), light emitting diode (LED) display, projector, or other display device to present information to a user of the apparatus 600 in a visual display.

One or more input devices 630 (e.g., an alphanumeric keyboard, microphone, keypad, remote controller, game controller, camera, or camera array) may be connected to the bus 614 via a user input port 622 to communicate information and commands to the apparatus 600. In selected embodiments, an input device 630 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 628, for example using a touch sensitive screen. A cursor control device may communicate direction information and command selections to the processor 602 and control cursor movement on the display 628. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method for training a model, the method comprising:
receiving, by a computing device, a first probability mapping a behavior to a characteristic of users in a plurality of users in a video delivery system, wherein a first part of the model is used to predict the first probability using first parameters that are fixed during the training;
receiving, by the computing device, a second probability mapping users in the plurality of users to a behavior, wherein the plurality of users is using an account on the video delivery system, wherein a second part of the model is used to predict the second probability using a second parameter that is being updated during the training;
calculating, by the computing device, a plurality of combined probabilities for the behavior and users in the plurality of users based on a combination of the first probability and the second probability;
analyzing, by the computing device, the plurality of combined probabilities to assign the behavior to a user in the plurality of users;
updating, by the computing device, a first value for the second parameter of the second part of the model while keeping the values for first parameters of the first part of the model fixed, wherein the updating is based on the behavior being assigned to the user to generate an updated first value for the second parameter; and
outputting, by the computing device, information for the updated first value for the second parameter of the second part of the model based on the training of the model.

2. The method of claim 1, wherein, to determine the values for the first parameters, the first part of the model is trained using supervised information that maps the behavior to the user.

3. The method of claim 1, wherein:
the training of the model trains the second part of the model, and
values for the first parameters of the first part of the model are updated prior to training of the second part of the model.

4. The method of claim 1, further comprising:
receiving an input that is used to calculate the first probability and the second probability.

5. The method of claim 4, wherein the input comprises:
the values for the first parameters of the first part of the model;
first information that the behavior is associated with the account; and
second information assigning the user to the behavior.

6. The method of claim 1, further comprising:
initializing the second parameter of the second part of the model with an initialization value.

7. The method of claim 6, further comprising:
updating the initialization value based on the updating of the second parameter of the second part of the model.

8. The method of claim 1, further comprising:
iteratively performing the updating of the second parameter of the second part of the model until a threshold is met, wherein the values for the first parameters when the threshold is met are output.

9. The method of claim 8, wherein iteratively performing the updating comprises:
performing the receiving of the first probability using the updated first value, the receiving the second probability using the updated first value, the calculating the plurality of combined probabilities based on the first probability and the second probability, and assigning the behavior to a user in the plurality of users until the threshold is met.

10. The method of claim 1, further comprising:
combining probabilities for a first set of probabilities from the first part of the model and probabilities for a second set of probabilities from the second part of the model to generate a joint probability for a plurality of pairs from combinations of a set of behaviors and the plurality of users.

11. The method of claim 1, wherein updating the first value for the second parameter comprises:
updating the first value for the second parameter based on the behavior that is assigned to the user.

12. The method of claim 1, wherein updating the first value for the second parameter comprises:
receiving a set of logs that include the behavior;
assigning the user to the behavior in the set of logs; and
updating the first value of the second parameter based on the assignment of the user to the behavior in the set of logs.

13. The method of claim 1, further comprising:
using the model to generate a prediction of the behavior to the user.

14. The method of claim 1, further comprising:
receiving a request for content;
determining contextual information for the request;
inputting the contextual information into the model; and
generating a prediction of the user in the plurality of users based on the contextual information.

15. The method of claim 14, further comprising:
using the prediction to select content based on the user, wherein content is associated with an attribute associated with the user.

16. The method of claim 14, further comprising:
using the prediction to select supplemental content based on the user, wherein the supplemental content is inserted into a video being played by the account.

17. A non-transitory computer-readable storage medium containing instructions for training a model, wherein the instructions, when executed, control a computer system to be operable for:
receiving a first probability mapping a behavior to a characteristic of users in a plurality of users in a video delivery system, wherein a first part of the model is used to predict the first probability using first parameters that are fixed during the training;
receiving a second probability mapping users in the plurality of users to a behavior, wherein the plurality of users is using an account on the video delivery system, wherein a second part of the model is used to predict the second probability using a second parameter that is being updated during the training;
calculating a plurality of combined probabilities for the behavior and users in the plurality of users based on a combination of the first probability and the second probability;
analyzing the plurality of combined probabilities to assign the behavior to a user in the plurality of users;
updating a first value for the second parameter of the second part of the model while keeping the values for first parameters of the first part of the model fixed, wherein the updating is based on the behavior being assigned to the user to generate an updated first value for the second parameter; and outputting information for the updated first value for the second parameter of the second part of the model based on the training of the model.

18. A method for training a model, the method comprising:
receiving, by a computing device, a request for content;
determining, by the computing device, contextual information for the request;
inputting, by the computing device, the contextual information into a model; and
generating, by the computing device, a prediction of a user from the model based on the contextual information, wherein the model is generated by:
calculating, by the computing device, a plurality of combined probabilities for a behavior and users in a plurality of users based on a first probability from a first part of the model and a second probability from a second part of the model;
analyzing, by the computing device, the plurality of combined probabilities to assign the behavior to a user in the plurality of users;
updating, by the computing device, a first value for a second parameter of the second part of the model while keeping values for first parameters of the first part of the model fixed, wherein the updating is based on the behavior being assigned to the user to generate an updated first value for the second parameter; and
using, by the computing device, the updated first value for the second parameter of the second part of the model based on the training of the model.

19. The method of claim 18, wherein the model is generated by:
receiving the first probability mapping a behavior to a characteristics of a user, wherein the first part of the model is used to predict the first probability; and
receiving the second probability mapping a user to the behavior, wherein the user is included in a set of users using an account, wherein a second part of the model is used to predict the second probability.

20. The method of claim 18, wherein the model is generated by:
training the second part of the model, wherein the first parameter of the first part of the model is updated prior to training of the second part of the model.

* * * * *